Figure 1:
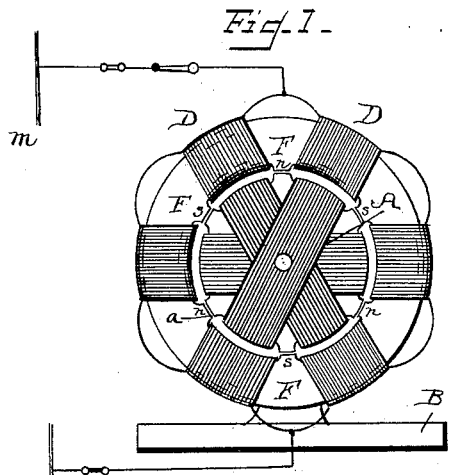

(No Model.) 2 Sheets—Sheet 1.

E. THOMSON.
ALTERNATING CURRENT ELECTRIC MOTOR.

No. 407,844. Patented July 30, 1889.

Witnesses
Ira R. Steward
Wm. H. Capel

Inventor
Elihu Thomson
By his Attorney
H. C. Townsend (No Model.) 2 Sheets—Sheet 2.

E. THOMSON.
ALTERNATING CURRENT ELECTRIC MOTOR.

No. 407,844. Patented July 30, 1889.

Witnesses
Ira R. Steward
H. H. Capel

Inventor
Elihu Thomson.
By his Attorney
H. C. Townsend

UNITED STATES PATENT OFFICE.

ELIHU THOMSON, OF LYNN, MASSACHUSETTS.

ALTERNATING-CURRENT ELECTRIC MOTOR.

SPECIFICATION forming part of Letters Patent No. 407,844, dated July 30, 1889.

Application filed November 17, 1888. Serial No. 291,165. (No model.)

*To all whom it may concern:*

Be it known that I, ELIHU THOMSON, a citizen of the United States, and a resident of Lynn, in the county of Essex and State of Massachusetts, have invented a certain new and useful Alternating-Current Electric Motor, of which the following is a specification.

My invention relates to means for developing motive power from an alternating electric current.

My invention provides a motor in which motive power may be developed by alternating currents on a single circuit, or by alternating currents the same in phase in the energizing-coils of the motor, and does not require, as do some previously-invented alternating-current motors, two circuits or sources supplying alternating currents of different or displaced phase in the energizing-field.

Briefly, my invention consists in the combination of a set of energizing-coils supplied with an alternating current of substantially the same phase in all the coils, and a set of coils inductively related to the first and kept in continually-closed, preferably uncommuted, circuit while the motor is running, one or the other or both sets or systems of coils being movable, as in ordinary electric motors.

By "uncommuted circuit" I mean that the two ends of the coil or coils are respectively always connected to the same ends or poles of the conducting-path over which their circuit is closed, thus dispensing with the use of a pole-changing commutator, by which the position of the coils in the circuit is constantly reversed. The closed circuit is one independent of that over which the inducing-current flows, and is in effect a short or local circuit, the currents of which are the induced currents set up by the field-magnet. The one set of coils supplied with alternating currents are properly wound or applied to produce poles alternately north and south in a circular field, and the other set of coils, forming the seat of induced currents produced by the first, are likewise wound or connected, so as to be capable of developing a series of poles alternately north and south, and preferably of the same number as those of the first-named set. Convenience demands that the closed-circuit system of coils should ordinarily be the movable set and sustain to the other, arranged as a fixed set, the mechanical relation of the movable armature of the usual electric motor. By adopting this plan the use of collecting-rings or commutating devices may be entirely avoided.

Combined with the motor are suitable devices for bringing the armature up to a moderate speed determined by the rapidity of the alternations, after which its speed will increase continually (under no or light loads) until full speed, or a speed almost synchronous with the rate of alternations supplied, is attained. The speed cannot go above a synchronizing speed. When the motor is running at full speed, it exerts a force tending to maintain that speed, and its energizing-coils being kept in circuit with the current-supply it continues to exert its motive action. The motor has the property of running either way with equal ease when it has been started in the desired direction of rotation. It may be constructed without either a commutator on the shaft, or even without collecting-rings, especially where the starting of the motor is from applied mechanical power. By modifications I make the motor self-starting when desired.

I will now describe some typical forms of apparatus embodying the invention, stating that of course the relative arrangement of parts may be variously modified or changed in many ways without changing the general character of the apparatus.

Special details and constructions forming a part of my invention will be described in connection with the accompanying drawings, and then more particularly specified in the claims.

Figure 2:
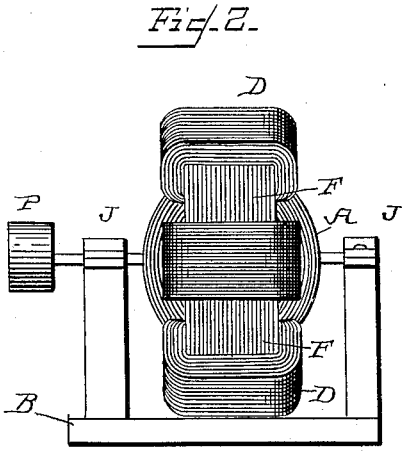
Figure 3:
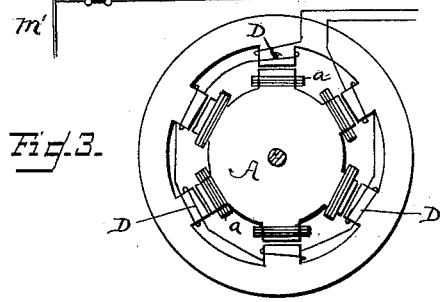
Figure 4:
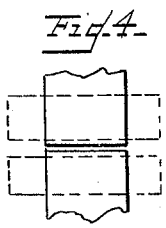
Figure 7:
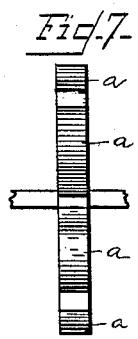
Figure 8:
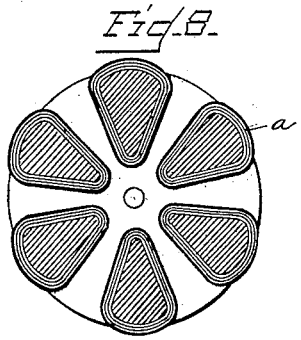
Figure 9:
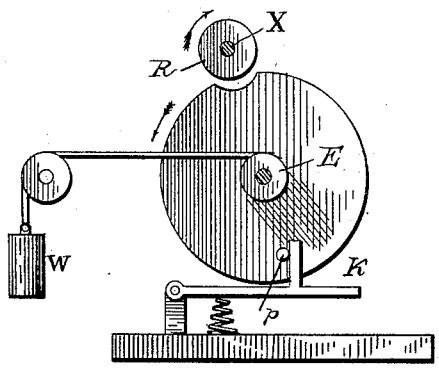
Figure 10:
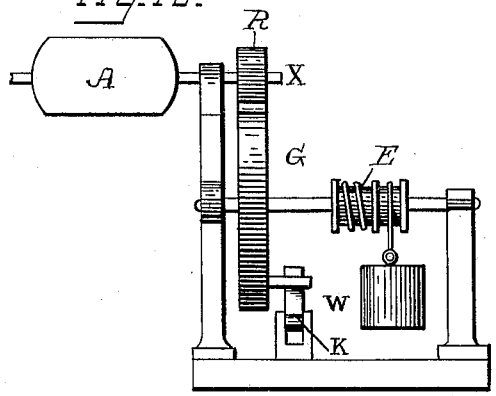
Figure 11:
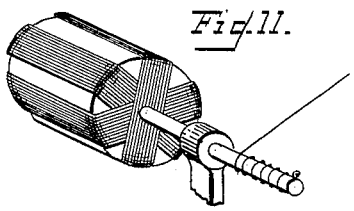
Figure 12:
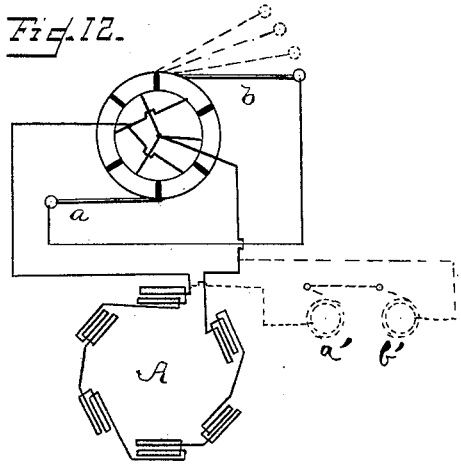
Figure 13:
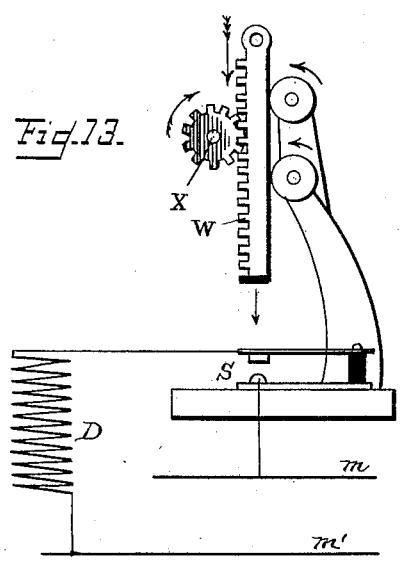
Figure 14:
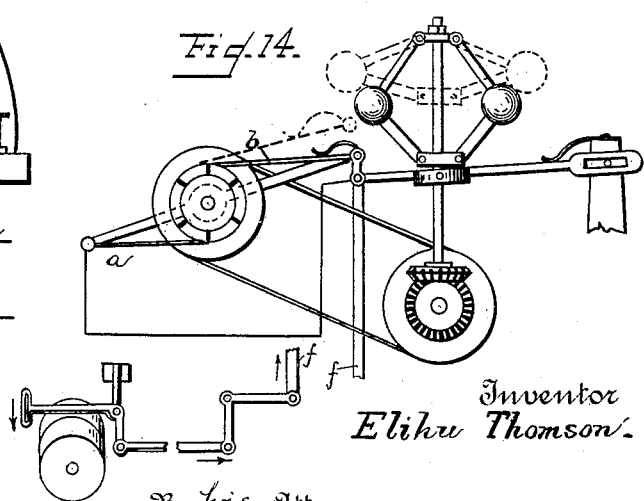

Figures 1 and 2 are elevations of one of the simplest embodiments of the invention. Figs. 3 and 4 illustrate the relation of the coils or circuits in another form. Figs. 5, 6, 7, and 8 show modified dispositions. Figs. 9 and 10 show a manually-controlled starting or initial rotational device for rotating the motor-shaft to a sufficient degree, so that the motor will increase its own speed up to its limit. Fig. 11 shows another simple means for starting. Fig. 12 illustrates another modified construction which permits electrical actions to be brought into play for starting. Fig. 13 shows another simple starter. Fig. 14 is an accessory device to that of Fig. 12.

In Figs. 1 and 2, B is a base supporting the stationary part F F, which is an iron ring with projections extending a short distance inward, as shown. The ring is made up of sheet-iron pieces punched to shape and piled up to the desired depth. The armature-core has an equal number of projections which run during revolution quite near to those on the ring F F. The armature-core is made of laminated iron or sheet punchings strung on or supported firmly by the shaft in any suitable way. In fact the same iron pieces which are punched out of the center of F F may be used for punching out the armature-cores of the motors. The spaces between the projections on the ring-cores F F are wound with insulated copper wire for the passage of alternating current, say of constant potential, from mains $m\ m'$.

The coils D D are connected to the mains or source of alternating currents in any desired way in multiple arc or in series. In the drawings they are shown arranged in multiple series. Each coil is wound or connected so that between the coils at the parts having the internal projections consequent poles will be produced by a current of any given polarity, such poles being alternately north and south, proceeding circumferentially, as indicated by the letters $n\ s$.

In the form of my invention shown in Fig. 1 the armature-core is made as a cylinder, and the coils $a$ upon the same are wound over the outside, after the manner of the coils in a well-known type of dynamo-electric machine. The coils are wound in the spaces between the projections on the armature-core. If there are six polar projections there may be three intersecting coils on the armature A and six coils on the field F F.

The armature may be made up of iron sheets in part and with others of thin steel intermixed, or may be of thin steel altogether, not too hard, the purpose of this being to give a lag to the currents in the armature-coils; also, the core may be surrounded with bands of copper in place of the coils. The armature-conductors are put on closed circuit. They should be about equal in conduction to the energizing-coils D D, so as to have a high lag or self-induction. The shaft is mounted in journals J J, as usual, and has a pulley P, arranged for delivery of power by belting. Now, if such a structure be connected with a circuit of alternating current, as indicated in Fig. 1, (say of fifteen thousand alternations per minute,) it will not turn; but if current is strong enough and a fair start be given in either direction to the motor-shaft, it will, if free to move, gradually increase its speed and (if six poles be used) not cease to increase until it has attained from two thousand four hundred to two thousand five hundred revolutions per minute, or something less than $15000 =$ alternations per minute. If four $\overline{6} =$ number of poles employed poles exist, it is $\frac{15000}{4}$, or about 3700. If eight poles, $\frac{15000}{8} = 1850$. After the motor has come up to speed, load may be gradually thrown on, and if not excessive will only slightly lower the speed. If too great, the motor may be brought down to a stoppage.

Figure 5:
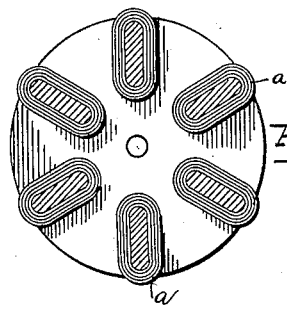
Figure 6:
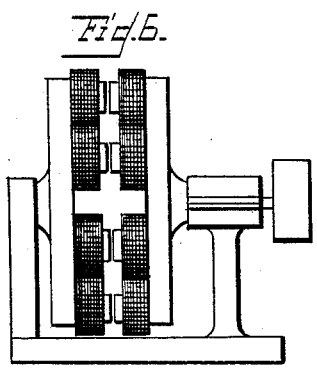

The explanation of the actions involved is quite complex and difficult to state in a few words or to give without numerous diagrams of current waves and impulses in each set of conductors at different positions during revolution. Suffice it to say that the original movement given to the rotating armature sets up a magnetic distortion, which, acting in conjunction with the lag of currents induced in the coils of the armature by the currents in the outside or stationary coils, permits a strong repulsive action to be exerted between the polar projections and coils when they are just passing out of juxtaposition, with a weakened repulsive action, or even an attraction, when the poles and coils are approaching opposition. This effect is greater when the speed is high; hence the torque is greater as the speed rises, especially when the speed of half full speed has been exceeded. Many arrangements of coils and cores may be used. In Fig. 3 the coils are carried on projections on both parts, one of each being shown, Fig. 4. The coils on the armature or the closed coils may either be closed singly or together in series or in other ways. Either system of coils may be the revolving system, or both may revolve oppositely. The poles of the field-magnet being of alternate polarity, proceeding circumferentially, the poles of the armature should be at liberty to take on by induction polarities alternating in sign circumferentially and to develop currents freely in the armature-coils on closed circuit. This is secured when the coils of the armature are in series circuit with one another by reversely connecting the successive coils, as well understood in the art. If the coil subjected to the action of each pole be on closed circuit by itself, as indicated in Fig. 3, the manner of winding the coil itself or of connecting its ends to one another is immaterial. The coils in Fig. 5 are on projections from the face of a disk suitably laminated. Fig. 6 shows two such disks facing, one rotary and the other fixed, either of which carries the closed system of coils or conductors. Figs. 7 and 8 show in elevation and edge view an armature-disk built up of coils in disk or plane at right angles to the shaft, which may be run between two disks, such as Fig. 5, stationary in character.

I will now proceed to describe some of the many devices that may be used for bringing the armature up to the speed where it will be picked up by the inducing-field, and will increase its speed to a speed determined by the number of alternations in proportion to the number of poles.

In Figs. 9 and 10, W is a weight on a string pulling on a cord wound several times round a small drum E on the same shaft with a larger drum or gear-wheel G, made in the form of a friction-disk, for turning a small friction-roll R on the armature-shaft X. A pin $p$, engaged by a removable catch K of any kind, holds the parts stationary until it is desired to start the motor. A gap is cut away under the roller on X and in the edge of G to free it in the position shown. When the wheel G rotates by W falling, it engages with R and turns it. After one or two revolutions of G, catch K may be used to stop the wheel G by the pin $p$ impinging thereon, while the shaft X, armature A, and roller R, being free to turn, continue to rotate freely. If alternating current of sufficient power traverses the coils of the motor while this rotation is given, the current acts to keep up the rotation and increase it up to its limit. Many other devices for starting might be used, and the apparatus of Figs. 9 and 10 is only shown as a type of such construction.

Fig. 11 shows an ordinary string or cord wound several times around the motor-shaft to be forcibly pulled off, as in spinning a top, for the purpose of starting the armature.

Fig. 12 shows how the principles of my former invention, Patent No. 363,185, may be utilized to start the motor and bring it up to speed, after which its armature-circuit is kept closed, and it runs in accordance with my present invention. In this instance a commutator has its alternate segments connected to the same end of the armature-coils, and one of its brushes $a$ $b$ is adjustable in the manner indicated in connection with brush $b$. When the brushes are diametrically opposite, or in position so that they will both be in contact with opposite segments simultaneously for the full time of the travel of the segment under the brush, it is obvious that the coils will be practically continuously connected through the wire joining the brushes as the segments travel under the brushes, suitable provision being made, as well understood in the art, to prevent rupture of connection as the dividing-points between the segments pass under the brushes. This may be accomplished by using a double brush whose collecting extent is greater than the width of the slot or insulating-space between the brushes. At the start brush $b$ is drawn back, so as not to be diametrically placed with respect to brush $a$. This has the effect, if brushes are set properly, to open circuit armature-coils for a time when they are approaching juxtaposition with field-coils D, Fig. 1, so that no repulsion can then take place. The motor, being given the least rotation, will start in accordance with my previous invention referred to and gradually increase its speed. As this occurs I prefer to gradually bring brush $b$ to the diametrical position with respect to brush $a$, when the armature is then completely short-circuited at all times. It will soon attain its full speed, if it has not before. When the condition of short circuit has been obtained on the commutator, it is obvious that the coils are in practically the same electrical condition as if their terminals were permanently joined, or as if they were connected to brushes bearing on continuous rings, which latter manner of connection might, in fact, be substituted for that through brushes $a b$, as indicated at $a'$ $b'$. If such provision be used as a substitute, it is only necessary to mount the various brushes so that they may be raised from contact with their cylinders. In Fig. 13 a mechanical device similar to that of Figs. 9 and 10 is shown, in that the propelling device automatically becomes disengaged or ungeared from the armature when the latter has been mechanically speeded up by the energizing-field. Here the weight W carries a rack to gear with the shaft; but the upper end of the weight or the gear is cut away, so that at the completion of the fall permitted to the weight the gear will be free from the gear on the shaft and leave the latter free to rotate under the influence of the current.

In fact, the completion of the fall of weight W may be the means for closing a switch S, which put current onto the motor and coils from the source $m$ $m'$. In general, the starting devices, when made as in Figs. 9, 10, 11, and 13, or any equivalent therefor, may similarly close a switch upon the completion of their starting function.

Fig. 14 shows how a centrifugal governor Z, or other speed-gear device driven by the motor-shaft in any suitable way, may be applied to move the commutator-brush of Fig. 14 as the speed increases. The governor Z moves the brush as required to satisfy the conditions, and does it gradually as the speed rises. It might also be made to throw on the load or shift a belt by an arm $f$ connecting with the usual devices for the purpose.

I do not claim herein the method of bringing an alternating-current motor into normal working, consisting in starting it with an organization under which it may receive an initial rotation, and on the attainment of a predetermined speed changing the structure or arrangement of connections to those with which the motor is designed to operate under load and while doing its work in its normal manner, as this invention and the special method of carrying it out by organizing and reorganizing the electrical connections for the purpose form the subject of another application for patent filed by me.

I do not claim herein the special device shown in Fig. 12, as this will form the subject of another application for patent.

What I claim as my invention is—

1. In an alternating-current electric motor, the combination of a field-magnet having a series of poles, four or more, and wound with coils connected to an alternating-current source in a manner to produce poles alternately north and south at the same time, and an armature having a corresponding number of poles, said armature being wound with coils forming the seat of currents induced by the field-magnet and connected in a continuously-closed uncommuted local circuit, as and for the purpose described.

2. In an alternating-current electric motor, the combination of a field-magnet core, of ring form, having internal radial projections, coils wound in the spaces between said projections and connected in proper manner to produce poles alternately north and south with any given current, a single alternating-current source connected to said coils, and an armature in the form of a cylinder having polar projections, the same in number as those of the field, and provided with half as many coils as the field, each of said coils being on closed circuit, as and for the purpose described.

3. The combination, with an alternating-current electric motor composed of a multipolar alternating field-magnet, and an armature having a corresponding number of poles and wound with coils placed on continued locally-closed circuit while the motor is running, of a mechanical starting device, as and for the purpose described.

4. The combination, with an alternating-current motor, of a mechanical propelling or starting device geared thereto through a gear cut away or reduced, so as to become automatically disengaged from the motor when the latter has been brought to the desired speed.

5. The combination, with an alternating-current electric motor, of a propelling or starting power geared to the motor through a wheel or gear which is provided with a gap or cut-away portion, and a stop for bringing the gear to rest in position of disengagement, as and for the purpose described.

6. The combination, with an alternating-current electric motor, of a starting or propelling device for giving initial rotation to the same, and a switch controlled by said starting device for turning the energizing-current into the motor after the same has received its mechanical impulse, as and for the purpose described.

7. In an alternating-current electric motor, the combination of a field-magnet maintained by energizing-coils supplied with a single set of alternating currents, and an induced-current armature carrying coils which are kept on continually-closed circuit independent of the first set, and with their same ends continually connected to the same poles of the external conductor or circuit over which their closure is effected.

8. An alternating-current motor comprising a multipolar field-magnet having four or more poles alternately north and south maintained by a single alternating current in the field-magnet coils, and an armature wound with a set of coils of high self-induction on a separate local circuit continuously closed while the motor is running at speed, and having a number of poles or polar projections the same as the field, as and for the purpose described.

9. The combination, with an alternating-current motor, of a mechanical starting or propelling mechanism, and an electric switch controlled thereby for connecting the motor to the energizing source when the armature has been speeded.

10. The combination, with an alternating-current electric motor provided with starting devices, of a speed gage or governor, and mechanism controlled by said governor for throwing the work onto the motor when the same has reached the required speed, as and for the purpose described.

11. The combination, with an alternating-current electric motor, of a commutator connected with the local-circuit armature-coils for cutting them out of circuit at predetermined points, a speed gage or governor, and mechanism controlled by said governor for putting the armature-coils on continuously-closed circuit when the motor has reached the required speed.

12. In an alternating-current electric motor, the combination of an energizing field-magnet maintained by a series of energizing-coils supplied with a single set of alternating currents, and an armature having a set of poles alternately north and south at the same time under the influence of induced currents in armature-coils which are continually on closed uncommuted circuit while the armature is running.

Signed at Lynn, in the county of Essex and State of Massachusetts, this 12th day of November, A. D. 1888.

ELIHU THOMSON.

Witnesses:
J. W. GIBBONEY,
GEO. E. EMMONS.